United States Patent
Ebrahimi Afrouzi et al.

(10) Patent No.: US 10,452,071 B1
(45) Date of Patent: Oct. 22, 2019

(54) OBSTACLE RECOGNITION METHOD FOR AUTONOMOUS ROBOTS

(71) Applicants: Ali Ebrahimi Afrouzi, San Jose, CA (US); Soroush Mehrnia, Copenhagen (DK)

(72) Inventors: Ali Ebrahimi Afrouzi, San Jose, CA (US); Soroush Mehrnia, Copenhagen (DK)

(73) Assignee: AI Incorporated, Toronto (CA)

( * ) Notice: Subject to any disclaimer, the term of this patent is extended or adjusted under 35 U.S.C. 154(b) by 22 days.

(21) Appl. No.: 15/442,992

(22) Filed: Feb. 27, 2017

Related U.S. Application Data

(60) Provisional application No. 62/301,449, filed on Feb. 29, 2016.

(51) Int. Cl.
*G05D 1/02* (2006.01)
*B25J 9/16* (2006.01)

(52) U.S. Cl.
CPC .......... *G05D 1/0214* (2013.01); *B25J 9/1676* (2013.01); *B25J 9/1697* (2013.01); *G05D 1/0246* (2013.01)

(58) Field of Classification Search
CPC ................ G05D 1/0253; G05D 1/0246; A47L 2201/04; A47L 2201/06
USPC ....... 382/103, 153, 156, 157, 159, 209, 278, 382/291; 700/255, 259, 261; 901/8
See application file for complete search history.

(56) References Cited

U.S. PATENT DOCUMENTS

| | | | |
|---|---|---|---|
| 6,591,161 B2 * | 7/2003 | Yoo | H01L 21/67796 414/800 |
| 6,611,120 B2 | 8/2003 | Song et al. | |
| 6,868,307 B2 | 3/2005 | Song et al. | |
| 6,957,712 B2 * | 10/2005 | Song | A47L 9/009 180/117 |
| 7,068,815 B2 * | 6/2006 | Chang | G06K 9/00624 382/103 |
| 7,218,994 B2 * | 5/2007 | Kanda | G05D 1/0251 318/568.12 |
| 7,386,163 B2 | 6/2008 | Sabe et al. | |
| 7,441,953 B2 * | 10/2008 | Banks | A61B 5/1038 378/197 |
| 7,478,091 B2 * | 1/2009 | Mojsilovic | G06F 19/321 |
| 7,480,958 B2 * | 1/2009 | Song | A47L 9/009 15/319 |
| 7,555,363 B2 * | 6/2009 | Augenbraun | A47L 5/225 134/18 |
| 7,706,917 B1 * | 4/2010 | Chiappetta | G05D 1/0225 700/245 |
| 7,761,954 B2 | 7/2010 | Ziegler et al. | |
| 7,805,220 B2 | 9/2010 | Taylor et al. | |

(Continued)

*Primary Examiner* — Yosef Kassa

(57) ABSTRACT

A method for identifying objects by an autonomous robot. Images of a work environment are captured by an image sensor positioned on the autonomous robot. An object dictionary containing image data regarding a set of objects is preloaded into the system. Captured images are transmitted to an image processor that processes the images to generate feature vector and identify objects within the images by comparison to objects in the object dictionary. Upon identifying an object in an image as an object from the object dictionary, the system executes a set of preprogrammed responses, which may include altering a movement path to avoid colliding with or driving over the object.

14 Claims, 1 Drawing Sheet

(56) References Cited

U.S. PATENT DOCUMENTS

| | | | | |
|---|---|---|---|---|
| 7,853,372 B2 * | 12/2010 | Park | ............ | G05D 1/0253 |
| | | | | 382/103 |
| 7,912,633 B1 * | 3/2011 | Dietsch | ............ | G01C 21/20 |
| | | | | 701/450 |
| 8,170,372 B2 * | 5/2012 | Kennedy | ............ | G06K 9/00 |
| | | | | 382/291 |
| 8,179,418 B2 * | 5/2012 | Wright | ............ | B25J 9/0003 |
| | | | | 348/14.05 |
| 8,428,778 B2 | 4/2013 | Landry et al. | | |
| 8,688,275 B1 * | 4/2014 | LaFary | ............ | G06N 3/008 |
| | | | | 700/251 |
| 8,930,019 B2 * | 1/2015 | Allen | ............ | G06F 1/1632 |
| | | | | 348/46 |
| 9,155,675 B2 * | 10/2015 | Ye | ............ | A61H 3/061 |

* cited by examiner

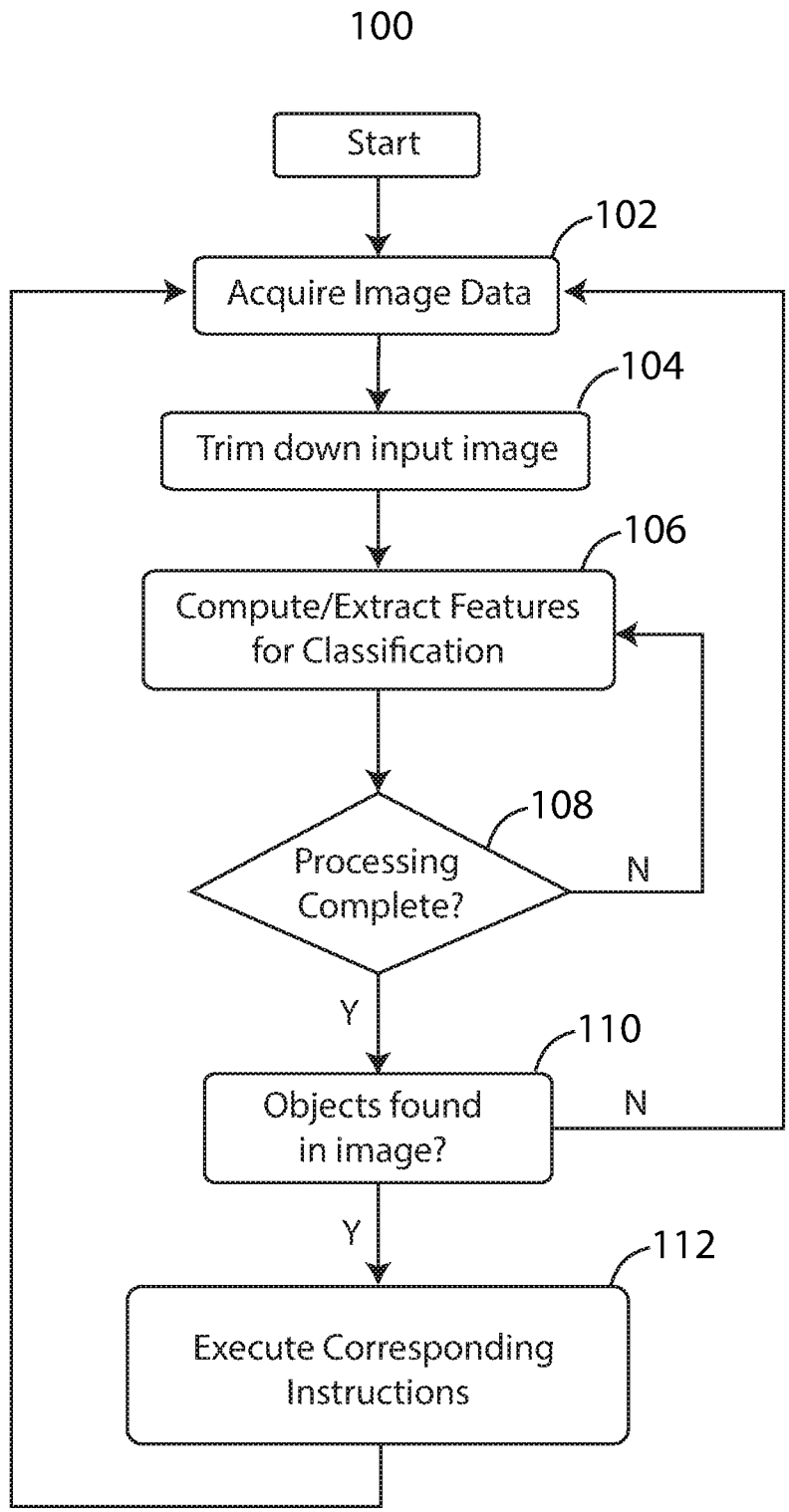

OBSTACLE RECOGNITION METHOD FOR AUTONOMOUS ROBOTS

CROSS-REFERENCE TO RELATED APPLICATIONS

This application claims the benefit of the provisional patent application Ser. No. 62/301,449 filed Feb. 29, 2016 by the present inventor.

FIELD OF THE INVENTION

The present invention relates to identifying objects and obstacles through machine or deep learning in autonomous robots.

BACKGROUND

Autonomous robots are being used with increasing frequency to carry out routine tasks, like vacuuming, mopping, cutting grass, polishing floors, etc. One problem that such robots often encounter is being obstructed by obstacles. Small obstacles like cords or wires, small clothing items, and toys might get stuck in a robot's wheels or other moving parts if it drives over them. Such obstructions may cause a robot to malfunction and/or be unable to complete work until an operator removes the obstruction. A need exists for a method to avoid such obstructions so that an autonomous robot is not encumbered by obstacles in a work area.

SUMMARY

It is a goal of the present invention to provide a method for an autonomous robot to recognize and avoid driving over small obstacles. This goal is achieved by providing an image sensor and image processor on an autonomous robot and using deep learning to analyze images captured by the image sensor and identify obstacles in the images. An object dictionary is preloaded into the system so that the processor may compare objects in images with objects in the object dictionary for similar features and characteristics. Once objects are identified, the system can alter its navigation path to drive around the objects.

BRIEF DESCRIPTION OF THE DRAWINGS

FIG. 1 illustrates the process of identifying obstacles by an autonomous robot embodying features of the present invention.

DETAILED DESCRIPTION OF THE INVENTION

The present invention introduces a method for autonomous robots to identify objects or obstacles in their work environment and react to them according to preset instructions. In this invention, an autonomous robot includes an image sensor (camera) to provide an input image and an object identification and data processing unit, which includes a feature extraction, feature selection and object classifier unit configured to identify a class to which the object belongs. The identification of the object that is included in the image data input by the camera is based on provided data for identifying the object and the image training data set. Training of the classifier is accomplished through a deep learning method, such as supervised or semi-supervised learning.

The image sensor, which is positioned on the body of the autonomous robot, captures images of the environment around the autonomous robot at predetermined angles. In some embodiments, the image sensor may be positioned and programmed to capture images of an area below the autonomous robot. The images are transmitted to the image processing unit. The image processing unit performs feature analysis of the images searching for a set of predefined objects. In some embodiments, the predefined objects may include obstacles such as cables, cords, socks, and other small objects that should be avoided by an autonomous robot.

Central to the object identification system is a classification unit that is previously trained by a method of deep learning in order to recognize predefined objects under different conditions, such as different lighting conditions, camera poses, colors, etc.

To recognize an object with high accuracy, feature amounts that characterize the recognition target object need to be configured in advance. Therefore, to prepare the object classification component of the data processing unit, different images of the desired objects are introduced to the system in a training set. After processing the images layer by layer, different characteristics and features of the objects in the training image set including edge characteristic combinations, basic shape characteristic combinations and the color characteristic combinations are determined by the deep learning algorithm(s) and the classifier component classifies the images by using the those key feature combinations.

When an image is received via the image sensor, the characteristics can be quickly and accurately extracted layer by layer until the concept of the object is formed and the classifier can classify the object. When the object in the received image is correctly identified, the robot can execute corresponding instructions. In some embodiments, a robot may be programmed to avoid some or all of the predefined objects by adjusting its movement path upon recognition of one of the predefined objects.

Referring to FIG. 1, the object recognition process 100 is illustrated. In a first step 102, the system acquires image data from the sensor. In a second step 104, the image is trimmed down to the region of interest (ROI). In a third step 106, image processing begins: features are extracted for object classification. In a next step 108, the system checks whether processing is complete by verifying that all parts of the region of interest have been processed. If processing is not complete, the system returns to step 106. When processing is complete, the system proceeds to step 110 to determine whether any predefined objects have been found in the image. If no predefined objects were found in the image, the system proceeds to step 102 to begin the process anew with a next image. If one or more predefined objects were found in the image, the system proceeds to step 112 to execute preprogrammed instructions corresponding to the object or objects found. In some embodiments instructions may include altering the robot's movement path to avoid the object. In some embodiments, instructions may include adding the found object characteristics to a database as part of an unsupervised learning in order to train the system's dictionary and/or classifier capabilities to better recognize objects in the future. After completing the instructions, the system then proceeds to step 102 to begin the process again.

We claim:

1. A method of identifying objects for autonomous robots comprising:

capturing images of a workspace by an image sensor disposed on an autonomous robot;

transmitting the captured images to a data processing unit disposed on the autonomous robot;
generating a feature vector from the images by the data processing unit;
using the data processing unit to compare objects in the images to objects in a preloaded object dictionary;
identifying a class to which objects belong using an object classification unit; and,
upon identifying an object from the object dictionary, executing a set of preprogrammed instructions corresponding to the object identified.

2. The method of claim 1 wherein the object dictionary contains any of: cables, cords, wires, toys, jewelry, undergarments, socks, shoes, shoelaces, feces, keys, food items, plastic bags, earphones, small animals, and tassels.

3. The method of claim 1 wherein preprogrammed instructions include altering a planned navigation path of the autonomous robot to avoid driving over an identified object.

4. The method of claim 1 wherein the preloaded object dictionary is based on a training set in which images of a plurality of examples of the objects in the object dictionary are processed by the data processing unit under varied lighting conditions and camera poses to extract and compile feature vector and characteristics data and associate that feature vector and characteristics data with a corresponding object.

5. The method of claim 4 in which feature vector and characteristics data includes any of: edge characteristic combinations, basic shape characteristic combinations, and color characteristic combinations.

6. The method of claim 1 in which the image sensor is positioned such that the images capture an area below a main body of the autonomous robot.

7. The method of claim 1 in which, upon identifying an object, feature vector and characteristics data of that object are added to the object dictionary.

8. A method for identifying objects by an autonomous robot comprising:
in a first step, capturing an image of a portion of a workspace by an image sensor disposed on an autonomous robot;
in a second step, transmitting the captured image to a data processing unit disposed on the autonomous robot;
in a third step, generating a feature vector from the image by the data processing unit;
in a fourth step, using the data processing unit to search for objects in the image by comparing the image data to objects in a preloaded object dictionary;
in a fifth step, if one or more objects are found in the image, identifying a class to which each of the objects belongs using an object classification unit; and,
in a sixth step, upon identifying an object from the object dictionary, executing a set of preprogrammed instructions corresponding to the object identified.

9. The method of claim 8 wherein the object dictionary contains any of: cables, cords, wires, toys, jewelry, undergarments, socks, shoes, shoelaces, feces, keys, food items, plastic bags, earphones, small animals, and tassels.

10. The method of claim 8 wherein preprogrammed instructions include altering a planned navigation path of the autonomous robot to avoid driving over an identified object.

11. The method of claim 8 wherein the preloaded object dictionary is based on a training set in which images of a plurality of examples of the objects in the object dictionary are processed by the data processing unit under varied lighting conditions and camera poses to extract and compile feature vector and characteristics data and associate that feature vector and characteristics data with a corresponding object.

12. The method of claim 11 in which feature vector and characteristics data includes any of: edge characteristic combinations, basic shape characteristic combinations, and color characteristic combinations.

13. The method of claim 8 in which the image sensor is positioned such that the images capture an area below a main body of the autonomous robot.

14. The method of claim 8 in which, upon identifying an object, feature vector and characteristics data of that object are added to the object dictionary.

* * * * *